United States Patent [19]

Minieri

[11] 3,929,705
[45] Dec. 30, 1975

[54] PRESERVATIVES FOR SURFACE-COATING COMPOSITIONS

[75] Inventor: Pasquale P. Minieri, Woodside, N.Y.

[73] Assignee: Tenneco Chemicals, Inc., Saddle Brook, N.J.

[22] Filed: Mar. 6, 1974

[21] Appl. No.: 448,734

[52] U.S. Cl. ............... 260/29.6 MN; 106/15 AF; 260/29.6 MQ; 260/29.7 N; 260/45.8 N; 260/45.95 P; 424/273
[51] Int. Cl.² ............................................. C09D 5/14
[58] Field of Search ........ 106/15 AF; 260/29.6 MN, 260/45.8 N, 29.6 MQ, 309.2, 45.95 P; 424/273

[56] References Cited
UNITED STATES PATENTS

| | | | |
|---|---|---|---|
| 2,933,504 | 4/1960 | Klopping | 106/15 |
| 3,147,274 | 9/1964 | Moyle et al. | 106/15 |
| 3,662,069 | 5/1972 | Dittmar | 106/15 |
| 3,779,973 | 12/1973 | Minieri | 260/29.6 MN |
| 3,814,714 | 6/1974 | Minieri | 260/29.6 |
| 3,816,447 | 6/1974 | Minieri | 260/29.6 MN |
| 3,817,761 | 6/1974 | Brake | 106/15 |
| 3,821,393 | 6/1974 | Janiak et al. | 260/309.2 |
| 3,826,657 | 7/1974 | Minieri | 260/29.6 |
| 3,845,212 | 10/1974 | Yovich et al. | 106/15 AF |

FOREIGN PATENTS OR APPLICATIONS

| | | | |
|---|---|---|---|
| 1,450,541 | 7/1966 | France | 260/309.2 |
| 1,472,978 | 2/1967 | France | 260/309.2 |

*Primary Examiner*—Eugene C. Rzucidlo
*Attorney, Agent, or Firm*—Evelyn Berlow

[57] ABSTRACT

Compounds that have the structural formula

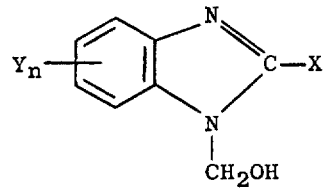

wherein X represents hydrogen, lower alkyl, —CH$_2$OH, or —SCH$_2$OH; Y represents nitro or halogen; and n represents a number in the range of 0 to 2 are used to protect surface-coating compositions from deterioration resulting from attack by fungi and bacteria. Among the most effective of these compounds as a biocide is 1-hydroxymethyl-2-methylbenzimidazole.

12 Claims, No Drawings

PRESERVATIVES FOR SURFACE-COATING COMPOSITIONS

This invention relates to surface-coating compositions that have improved resistance to deterioration resulting from attack by fungi, bacteria, and other microorganisms. More particularly, it relates to surface-coating compositions that contain biocidal amounts of N-hydroxymethylbenzimidazoles.

It is well known in the art that paints and varnishes often have inadequate resistance to the action of microorganisms. Some of these coating compositions, such as enamels and house paints, contain as their resinous binders drying oils, oleoresinous varnishes, or alkyd resins, which are subject to attack by fungi and bacteria. Others, for example, aqueous dispersions of waterinsoluble synthetic linear polymers, generally contain as plasticizers and thickeners materials that have their origin in animal or vegetable sources and that render the compositions susceptible to mildew. The resulting deterioration of the surface-coating compositions seriously hinders their full scale utilization, particularly in those areas and in those applications that are conducive to such attack.

Various biocidal materials have been suggested for use in surface-coating compositions, but none has proven entirely satisfactory in this application. Some do not provide the required prolonged protection against attack by microorganisms, while others undergo sulfide staining and still others hydrolyze in alkaline aqueous paint systems or separate from the applied coating by migration, volatilization, or leaching once the coating has been spread in a thin layer over the surface to be protected.

This invention relates to biocides that are of particular value in surface-coating compositions. These biocides, which are thoroughly compatible with the resinous binders that commonly are used in surface-coating compositions and which are resistant to sulfide staining, provide excellent and prolonged resistance to deterioration resulting from attack by fungi and other microorganisms without adversely affecting the color, pH, viscosity, and other physical properties of the surface-coating compositions.

The biocidal compounds that are used in the surface-coating compositions of this invention are N-hydroxymethylbenzimidazoles. These compounds have the structural formula

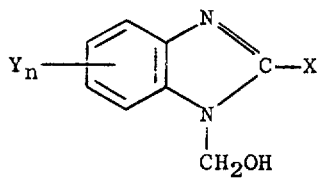

wherein X represents hydrogen, alkyl of 1 to 4 carbon atoms, hydroxymethyl, or hydroxymethylthio; Y represents nitro or halogen; and n represents a number in the range of 0 to 2.

Illustrative of these compounds are the following: 1-hydroxymethylbenzimidazole, 1-hydroxymethyl-2-methylbenzimidazole, 1-hydroxymethyl-2-ethylbenzimidazole, 1-hydroxymethyl-2-butyl-5-bromobenzimidazole, 1-hydroxymethyl-5-nitrobenzimidazole, 1-hydroxymethyl-6-chlorobenzimidazole, 1-hydroxymethyl-2-methyl-5-chlorobenzimidazole, 1-hydroxymethyl-5,7-dichlorobenzimidazole, 1-hydroxymethyl-2-propyl-5,6-dinitrobenzimidazole, 1,2-bis(hydroxymethyl)benzimidazole, 1,2-bis(hydroxymethyl)-5-bromobenzimidazole, 1-hydroxymethyl-2-hydroxymethylthiobenzimidazole, 1-hydroxymethyl-2-hydroxymethylthio-5,6-dibromobenzimidazole, 1-hydroxymethyl-2-ethyl-6-iodobenzimidazole, 1-hydroxymethyl-2-butyl-5-fluoro-benzimidazole, and the like.

The biocidal compounds of this invention may be prepared by any suitable and convenient procedure. They can, for example, be prepared by the reaction of the appropriate benzimidazole or substituted benzimidazole with paraformaldehyde. The reaction, is usually carried out in a solvent, such as methanol or isopropanol, at the reflux temperature of the reaction mixture.

The 1-hydroxymethylbenzimidazoles of this invention can be used to impart fungal and bacterial resistance to a wide variety of surface-coating compositions including both organic solvent-based and water-based coating systems.

In a preferred embodiment of the invention, the 1-hydroxy-methylbenzimidazoles are used as the biocide in aqueous surface-coating compositions that contain about 10 percent to 60 percent by weight of a water-insoluble, film-forming, resinous binder that is an oleoresinous binder, a synthetic linear additon binder, or a mixture of these binders. Suitable oleoresinous binders include drying oils, such as linseed oil, tung oil, soybean oil, dehydrated castor oil, safflower oil, or fish oil; bodied drying oils; blends of drying oils or bodied drying oils with a resin component, such as limed rosin, an ester gum, or a phenolic resin; oleoresinous varnishes formed by heating one of the aforementioned resins with one or more drying oils or bodied drying oils; and alkyd resins, which are resinous products resulting from the reaction of a polyhydric alcohol, such as pentaerythritol or glycerol, with a dicarboxylic acid, such as phthalic anhydride, and fatty acids. The useful aqueous dispersions of synthetic linear addition polymers are ordinarily prepared by the emulsion polymerization of ethylenically unsaturated compounds, especially those of monoethylenically unsaturated character, although butadiene, chlorobutadiene, and isoprene may be used to some extent. Illustrative of the synthetic linear addition polymers that can be used as the resinous binder in the aqueous dispersions are polyvinyl acetate; polyvinyl butyrate; polyvinyl chloride; copolymers of vinyl acetate with vinyl chloride; copolymers of vinyl acetate with acrylonitrile; copolymers of vinyl chloride with acrylonitrile; copolymers of vinyl chloride with vinylidene chloride; polyethylene; polyisobutylene; polystyrene; copolymers of styrene with butadiene; copolymers of acrylonitrile with butadiene; copolymers of methyacrylic acids esters of alcohols having 1 to 8 carbon atoms with vinyl acetate, vinyl chloride, acrylonitrile, or styrene; copolymers of acrylic acid esters of alcohols having 1 to 8 carbon atoms with vinyl acetate, vinyl chloride, acrylonitrile, or styrene; copolymers of the aforementioned acrylic acid esters, the aforementioned methacrylic acid esters, and acrylic acid; and copolymers of styrene with maleic anhydride.

The 1-hydroxymethylbenzimidazoles can also be used as the biocide in organic solvent-based systems that contain an oleoresinous binder as hereinbefore defined.

Only a small amount of the 1-hydroxymethylbenzimidazole is required to protect the surface-coating composition from attack by fungi and bacteria. As little as 0.10% of one or more of these compounds, based on the weight of the composition, will bring about an appreciable improvement in the resistance of the composition to attack by microorganisms. Three percent or more of the biocidal compounds can be used, but these larger amounts generally do not provide further improvement in the properties of the surface-coating compositions and for this reason are not ordinarily used. The amount of the biocidal compound that will provide optimum protection for a surface-coating composition depends upon such factors as the choice of biocidal compound, the choice of resinous binder and other components of the surface-coating composition and the amount of each that is used, and the application for which the coating composition is intended. In most cases about 1 percent to 2 percent of the 1-hydroxymethylbenzimidazoles, based on the weight of the surface-coating composition, is used to protect the composition from attack by fungi, and 0.2 percent to 0.6 percent of the 1-hydroxymethylbenzimidazoles, based on the weight of the composition, is used to protect aqueous surface-coating compositions from attack by bacteria.

In addition to the resinous binder and the biocidal compound, the surface-coating compositions may contain various auxiliary materials, such as pigments, extenders, solvents, dyes, defoaming agents, driers, thickeners, emulsifiers, plasticizers, and the like in the amounts ordinarily used for these purposes.

The biocidal compounds may be incorporated into the surface-coating compositions by any convenient procedure. For example, they can be combined with the pigments and other components to form a pigment phase that is mixed with the resinous binder and water or organic solvent to form the surface-coating composition. Alternatively, they can be added to a composition that contains the resinous binder, pigment, and water or organic solvent. The biocidal compounds can be added as such to the other components, or they can be added as a solution in, for example, an alcohol, ether, or ketone.

The invention is further illustrated by the examples that follow:

EXAMPLE 1

A mixture of 17.7 grams (0.15 mole) of benzimidazole, 6.85 grams (0.228 mole) of paraformaldehyde, 1 ml. of 5% aqueous sodium hydroxide solution, and 125 ml. of isopropanol was heated at its reflux temperature for 30 minutes and then cooled in an ice bath. The solid product was separated from the reaction mixture by filtration and dried under vacuum at 60°C. There was obtained 17.7 grams (80% yield) of 1-hydroxymethylbenzimidazole, which melted at 139°–143°C. (literature, 139°–141°C.).

EXAMPLE 2

A mixture of 27.0 grams (0.2 mole) of 2-methylbenzimidazole, 9.0 grams (0.3 mole) of paraformaldehyde, 0.5 ml. of 5% aqueous sodium hydroxide solution, and 250 ml. of isopropanol was heated at its reflux temperature for 1.5 hours, cooled to room temperature, and diluted with 150 ml. of isopropanol. The solid product was separated from the reaction mixture by filtration, washed twice with ice-cold isopropanol and once with ice-water, and then dried under vacuum at 60°C. There was obtained 17.0 grams (52.3% yield) of 1-hydroxymethyl-2-methylbenzimidazole, which melted at 142.5°–148°C.

EXAMPLE 3

A mixture of 24.5 grams (0.15 mole) of 6-nitrobenzimidazole, 6.85 grams (0.228 mole) of paraformaldehyde, 1 ml. of 5% aqueous sodium hydroxide solution, and 125 ml. of isopropanol was heated at its reflux temperature for one hour, cooled in an icebath, and filtered. The product was washed with isopropanol and dried under vacuum at 60°C. There was obtained 28.9 grams (100% yield) of 1-hydroxymethyl-6-nitrobenzimidazole, which melted at 189°–202°C. (literature, 197°C.).

EXAMPLE 4

A mixture of 25 grams (0.15 mole) of 2-methyl-5-chlorobenzimidazole, 6.75 grams (0.15 mole) of paraformaldehyde, 0.2 ml. of a 5% aqueous sodium hydroxide solution, and 150 ml. of isopropanol was heated at its reflux temperature for 2 hours. The mixture was cooled to room temperature, stirred with 5 grams of activated carbon and 2.5 grams of filter-aid, and filtered. The product was washed with cold isopropanol and dried under vacuum at 50°C. There was obtained 13.4 grams (45.5% yield) of 1-hydroxymethyl-2-methyl-5-chlorobenzimidazole, which melted at 159°–165°C. The product contained 56.99% C, 4.67% H, and 14.68% N (calculated, 55.1% C, 4.58% H, and 14.25% N).

EXAMPLE 5

A mixture of 29.6 grams (0.2 mole) of 2-benzimidazolemethanol, 9.0 grams (0.3 mole) of paraformaldehyde, 0.2 ml. of a 5% aqueous sodium hydroxide solution, and 150 ml. of isopropanol was heated at its reflux temperature for 30 minutes. The mixture was heated to 80°C. under vacuum to remove the solvent. The residue (36.6 grams) was dissolved in 50 ml. of hot isopropanol, and the resulting solution was diluted with about 200 ml. of benzene. The solid that precipitated was separated from the solution and dried. There was obtained 26.8 grams (50.2% yield) of 1,2-bis-(hydroxymethyl)benzimidazole, which melted at 109°–110°C. and which contained 61.9% C, 6.01% H, and 16.17% N (calculated, 60.7% C, 5.62% H, and 15.7% N).

EXAMPLE 6

A mixture of 22.5 grams (0.15 mole) of 2-mercaptobenzimidazole, 60 ml. (0.75 mole) of a 37% aqueous formaldehyde solution, and 200 ml. of water was stirred at room temperature for 24 hours. An additional 50 ml. of water was added, and the reaction mixture was stirred for one hour and then filtered. The product was washed with water and dried under vacuum at 45°–50°C. There was obtained 29.2 grams (92.5% yield) of 1-hydroxymethyl-2-hydroxymethylthiobenzimidazole, which melted at 142°–148°C. and which contained 52.08% C, 4.59% H, and 13.90% N (calculated, 51.4% C, 4.77% H, and 13.33% N).

EXAMPLE 7

A. A polyvinyl acetate emulsion paint was prepared by mixing together the following materials:

| | Parts by Weight |
|---|---|
| Water | 481.5 |
| 25% Aqueous solution of sodium salt of maleic anhydride/diisobutylene copolymer | 24 |
| Potassium pyrophosphate | 3 |
| Long chain fatty acid alkanolamide | 9 |
| Defoamer | 6 |
| Ethylene glycol | 75 |
| 1-1/4% Aqueous solution of hydroxyethylcellulose | 375 |
| Aqueous emulsion containing 55% of polyvinyl acetate | 1299 |
| Diethyl ether of diethylene glycol | 30 |
| Titanium dioxide | 690 |
| Talc | 345 |
| Calcium metasilicate | 150 |

This paint had the following properties as determined by standard paint test procedures:

| | |
|---|---|
| Viscosity | 65 K.U. |
| Brookfield Viscosity (No. 4 Spindle, 60 rpm) | 800 cps. |
| pH | 7.8 |
| Yellowness Index | 3.0 |

B. An acrylic latex paint was prepared by mixing together the following materials:

| | Parts by Weight |
|---|---|
| Water | 168 |
| Alkyl aryl ether surfactant | 6 |
| 25% Aqueous solution of sodium salt of maleic anhydride/diisobutylene copolymer | 27 |
| Defoamer | 12 |
| 2% Aqueous solution of hydroxyethylcellulose | 300 |
| Ethylene glycol | 60 |
| Titanium dioxide | 750 |
| Mica (waterground) | 90 |
| Calcium carbonate | 375 |
| Ammonium hydroxide (28%) | 6 |
| Aqueous dispersion containing 46% acrylic ester copolymer (66% ethyl acrylate, 32.5% methyl acrylate, and 1.5% acrylic acid) | 1642 |

This paint had the following properties:

| | |
|---|---|
| Viscosity | 72 K.U. |
| Brookfield Viscosity (No. 3 Spindle, 60 rpm) | 1250 cps. |
| pH | 9.2 |
| Yellowness Index | 2.6 |

C. An exterior house paint was prepared by mixing together the following materials:

| | Parts by Weight |
|---|---|
| Basic lead carbonate | 288 |
| Zinc oxide | 232 |
| Titanium dioxide (rutile) | 149 |
| Talc | 260 |
| Linseed oil | 242 |
| Bodied linseed oil | 114 |
| Mineral spirits | 114 |
| Antiskinning agent (Exkin 2) | 2 |
| Manganese naphthenate (6%) | 2.27 |
| Lead naphthenate (24%) | 11.3 |

EXAMPLE 8

Small amounts of the biocidal compounds of Examples 1 to 6 were added to portions of the paints whose preparation is described in Example 7, and the treated paints were evaluated by means of an agar diffusion assay. In this test agar is inoculated with the test organism, the treated paint is placed in a well cut from the agar, and after incubation at 28°C. and 85–95% relative humidity, the activity of the biocide is measured by zones of inhibition. The biocidal compounds tested, the amounts of each that were used, and the results obtained are given in Table I. In this table

| | | |
|---|---|---|
| ZO | = | Zone of inhibition in mm. |
| O | = | No zone of inhibition; no growth |
| Tr | = | Trace zone of inhibition |
| — | = | Not tested |
| Bacteria | A | — Mixed paint spoilage strains |
| | B | — Pseudomonas aeruginosa |
| | C | — Aerobacter aerogenes |
| Fungi | 1 | — Pullularia pullulans |
| | 2 | — Penicillium crustosum |
| | 3 | — Aspergillus niger |

EXAMPLE 9

Small amounts of the biocidal compounds of this invention were added to portions of the paints whose preparation is described in Example 7, and the treated paints were evaluated by the following procedure:

A mixed bacterial inoculum was prepared by incubation of inoculated (0.5 ml.) mild dilution bottles containing 50 ml. of solidified Trypticase-Soy Agar.

After incubation for 18 to 24 hours at 35°C., the cultures were removed from the agar surface, diluted to an appropriate Table I Activity of N-Hydroxymethylbenzimidazoles as Biocides in Paints

| Biocide | Paint | Test Level (%) | pH | Effect on Liquid Paint | | | Biocidal Activity | | | | | |
|---|---|---|---|---|---|---|---|---|---|---|---|---|
| | | | | Odor | Color | Viscosity | Bacteria A | B | C | Fungi 1 | 2 | 3 |
| 1-Hydroxymethyl-benzimidazole | PVA | 2 | 7.0 | Slight | None | None | ZO-10 | ZO-8 | ZO-8 | ZO-8 | ZO-9 | ZO-3 |
| | Acrylic | 2 | 7.2 | " | " | Gelled | ZO-9 | ZO-5 | ZO-5 | ZO-5 | ZO-6 | ZO-3 |
| | | 1 | 7.9 | None | " | None | ZO-3 | Tr | Tr | 0 | ZO-1 | Tr |
| | | 0.5 | 8.8 | " | " | " | ZO-1 | Tr | 0 | 0 | 0 | 0 |
| | | 0.25 | 9.0 | " | " | " | 0 | 0 | 0 | 0 | 0 | 0 |
| | Oil | 2 | — | " | " | " | — | — | — | Tr | ZO-1 | Tr |
| 1-Hydroxymethyl-2-methylbenzimidazole | PVA | 2 | 7.0 | None | None | None | ZO-10 | ZO-8 | ZO-9 | ZO-9 | ZO-7 | Tr |
| | | 1 | 7.0 | " | " | " | ZO-9 | ZO-8 | ZO-5 | Tr | Tr | Tr |
| | | 0.5 | 6.9 | " | " | " | ZO-7 | ZO-5 | ZO-3 | 0 | 0 | 0 |
| | | 0.1 | 7.2 | " | " | " | Tr | Tr | Tr | 0 | 0 | 0 |
| | Acrylic | 2 | 8.0 | " | " | " | ZO-8 | ZO-7 | ZO-8 | ZO-8 | ZO-10 | Tr |
| | | 1 | 8.1 | " | " | " | ZO-7 | ZO-8 | ZO-5 | Tr | Tr | Tr |
| | | 0.5 | 8.4 | " | " | " | Tr | ZO-5 | ZO-3 | 0 | 0 | 0 |
| | | 0.1 | 8.5 | " | " | " | 0 | 0 | 0 | 0 | 0 | 0 |
| | Oil | 2 | — | " | " | " | — | — | — | 0 | Tr | Tr |
| | | 1 | — | " | " | " | — | — | — | 0 | 0 | 0 |
| 1-Hydroxymethyl-2-methyl-5-chloro-benzimidazole | PVA | 2 | 7.1 | None | Beige | None | ZO-7 | ZO-5 | ZO-7 | ZO-1 | ZO-3 | Tr |
| | Acrylic | 2 | 7.4 | " | " | Gelled | ZO-7 | ZO-1 | ZO-3 | ZO-3 | ZO-6 | Tr |
| | Oil | 2 | — | " | " | None | — | — | — | 0 | 0 | 0 |

Table I-continued

Activity of N-Hydroxymethylbenzimidazoles as Biocides in Paints

| Biocide | Paint | Test Level (%) | pH | Effect on Liquid Paint | | | Biocidal Activity | | | | | |
|---|---|---|---|---|---|---|---|---|---|---|---|---|
| | | | | Odor | Color | Viscosity | Bacteria A | B | C | Fungi 1 | 2 | 3 |
| 1-Hydroxymethyl-6-nitrobenzimidazole | PVA | 2 | 7.1 | None | None | None | ZO-10 | ZO-3 | ZO-5 | Tr | ZO-3 | Tr |
| | Acrylic | 2 | 8.4 | " | " | " | ZO-5 | ZO-3 | Tr | 0 | 0 | 0 |
| | Oil | 2 | — | " | " | " | — | — | | 0 | 0 | 0 |
| 1,2-Bis(hydroxymethyl)benzimidazole | PVA | 2 | 7.3 | None | None | None | ZO-14 | ZO-6 | ZO-8 | ZO-8 | ZO-6 | Tr |
| | Acrylic | 2 | 7.5 | " | " | Gelled | ZO-8 | ZO-7 | ZO-6 | Tr | Tr | Tr |
| | Oil | 2 | — | " | " | None | — | — | — | 0 | 0 | 0 |
| 1-Hydroxymethyl-2-hydroxymethylthiobenzimidazole | PVA | 2 | 7.1 | None | None | Gelled | ZO-15 | ZO-6 | ZO-7 | ZO-10 | ZO-5 | Tr |
| | | 1 | 7.3 | " | " | None | ZO-10 | ZO-7 | ZO-5 | ZO-6 | ZO-1 | Tr |
| | | 0.5 | 7.3 | " | " | " | ZO-5 | ZO-3 | ZO-4 | ZO-2 | ZO-1 | Tr |
| | | 0.1 | 7.3 | " | " | " | ZO-1 | ZO-1 | Tr | 0 | 0 | 0 |
| | Acrylic | 2 | 6.5 | " | " | Gelled | ZO-4 | ZO-3 | ZO-7 | ZO-3 | ZO-4 | Tr |
| | | 1 | 7.4 | " | " | " | ZO-5 | Tr | ZO-1 | ZO-2 | Tr | 0 |
| | | 0.5 | 8.2 | " | " | " | ZO-1 | 0 | 0 | 0 | 0 | 0 |
| | | 0.1 | 8.5 | " | " | None | 0 | 0 | 0 | 0 | 0 | 0 |
| | Oil | 2 | — | " | " | " | — | — | — | 0 | 0 | 0 |
| | | 1 | — | " | " | " | — | — | — | 0 | 0 | 0 |
| | | 0.5 | — | " | " | " | — | — | — | 0 | 0 | 0 |
| | | 0.1 | — | " | " | " | — | — | — | 0 | 0 | 0 |
| Bis(phenylmercury)-dodecenylsuccinate (Super Ad-it) | PVA | 2 | 7.0 | None | None | None | ZO-7 | 0 | 0 | ZO-12 | ZO-10 | ZO-8 |
| | Acrylic | 2 | 8.5 | " | " | " | ZO-12 | ZO-8 | ZO-7 | ZO-10 | ZO-4 | ZO-12 |
| | Oil | 2 | — | " | " | " | — | — | — | ZO-8 | ZO-2 | ZO-13 |
| None | PVA | — | 7.2 | None | None | None | 0 | 0 | 0 | 0 | 0 | 0 |
| | Acrylic | — | 8.8 | " | " | " | 0 | 0 | 0 | 0 | 0 | 0 |
| | Oil | — | — | " | " | " | — | — | — | 0 | 0 | 0 | volume in phosphate buffer (0.05 M, pH 7.0), and inoculated into 300 gram portions of the test paints. The amount of the culture added to the paint was such that the final level of bacteria was between $0.5 \times 10^6$ and $3 \times 10^6$ per gram of paint. After thorough mixing, the paints were incubated at 35°C. under 90 percent relative humidity. At intervals during the incubation, measurements of viability of the bacteria and viscosity of the paint were made. The viability test was carried out by adding an aliquot of the paint to Trypticase-Soy Broth containing lecithin and Tween 80, incubating for 48 hours at 35°C., and then streaking the broth on a Trypticase-Soy Agar plate. After a 24 hour incubation period at 35°C., the plates were examined for growth along the streak. The results obtained are reported in Table II as + (growth present) or − (growth absent). The viscosity of the paint samples was measured at 25°C. with a Brookfield Viscometer Model RVM using a No. 4 spindle at 20 rpm. The percentage decrease of the viscosity of each of the treated paints during the incubation period is reported in Table II.

EXAMPLE 10

Several of the paints whose preparation is described in Example 8 were applied to cedar panels that were then exposed on test fences. The panels were inspected periodically to determine the amount of mildew on the paint films. The paints tested and the results obtained are given in Table III. In this table, 0 indicates no mildew; 2, slight amount of mildew; 4, slight to moderate amount of mildew; 6, moderate amount of mildew; 8 moderate to large amount of mildew; and 10, large amount of mildew.

Table II

N-Hydroxymethylbenzimidazoles as Paint Preservatives

| Biocide | Paint | Test Level % based on wt. of paint | Culture* | % Viscosity Change Incubation Period (days) | | | Viability Incubation Period (days) | | | | | | |
|---|---|---|---|---|---|---|---|---|---|---|---|---|---|
| | | | | 7 | 14 | 21 | 1 | 2 | 3 | 7 | 9 | 14 | 21 |
| 1-Hydroxymethyl-2-methylbenzimidazole | PVA | 0.25 | K | 2.9 | 0 | 0 | + | − | − | − | − | − | − |
| | | 0.40 | I | 2.9 | 0 | 1.0 | − | − | − | − | − | − | − |
| | | 0.25 | I | 6.1 | 3.3 | 2.3 | − | − | − | − | − | − | − |
| | | 0 | I | 5.5 | 0 | 0 | + | + | + | + | + | + | + |
| | | 0 | K | 6.1 | 7.3 | 8.4 | + | + | + | + | + | + | + |
| | Acrylic | 0.60 | I | 0 | 0 | 0 | + | + | − | − | − | − | − |
| | | 0.40 | I | 0 | 0 | 0 | + | + | − | − | − | − | − |
| | | 0 | I | 8.7 | 2.9 | 3.8 | + | + | + | + | + | + | + |
| 1,2-Bis(hydroxymethyl)-benzimidazole | PVA | 0.25 | K | 0 | 0 | 0 | + | + | − | − | − | − | − |
| | | 0.40 | I | 0 | 0 | 0 | + | + | − | − | − | − | − |
| | | 0.25 | I | 0 | 0 | 0 | + | − | − | − | − | − | − |
| | | 0 | K | 0 | 0 | 0 | + | + | + | + | + | + | + |
| | | 0 | I | 5 | 6 | 16 | + | + | + | + | + | + | + |
| | Acrylic | 0.40 | K | 0 | 0 | 0 | + | + | − | − | − | − | − |
| | | 0 | K | 4.5 | 9.0 | 4.5 | + | + | + | + | + | + | + |

*K = Mixture of Pseudomonas aeruginosa and Aerobacter aerogenes
I = Mixture of Bacillus subtilis, Bacillus megaterium, and Bacillus licheniformis

Table III

Outdoor Exposure Panel Evaluation

| Months on Test Fence | Location of Test Fence | Biocide | Test Level (%) | Paint | Mildew Rating |
|---|---|---|---|---|---|
| 6 | Puerto Rico | 1-Hydroxymethyl-2-methylbenz-imidazole | 1.5 | Acrylic | 0 |
|  |  | Bis(phenylmercuric)-dodecenyl succinate | 1.5 | Acrylic | 0 |
|  |  | None | — | Acrylic | 2 |
| 14 | Pensacola, Florida | 1-Hydroxymethyl benzimidazole | 2 | Acrylic | 2 |
|  |  | Bis(phenylmercuric)-dodecenyl succinate | 2 | Acrylic | 2 |
|  |  | None | — | Acrylic | 6 |
| 17 | Piscataway, New Jersey | 1-Hydroxymethyl-benzimidazole | 2 | PVA | 2 |
|  |  | Bis(phenylmercuric)-dodecenyl succinate | 2 | PVA | 0 |
|  |  | None | — | PVA | 6 |

What is claimed is:

1. A surface-coating composition having improved resistance to attack by fungi and bacteria that comprises (a) a water-insoluble, film-forming, resinous binder selected from the group consisting of oleoresinous binders, synthetic linear addition polymers obtained by the vinyl polymerization of ethylenically-unsaturated molecules, and mixtures thereof and (b) about 0.10 percent to 3 percent, based on the weight of said composition, of a biocidal compound having the structural formula

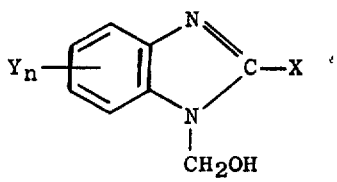

wherein X represents hydrogen, alkyl of 1 to 4 carbon atoms, hydroxymethyl, or hydroxymethylthio; Y represents nitro or halogen; and n represents a number in the range of 0 and 2.

2. A surface-coating composition as set forth in claim 1 wherein the biocidal compound is 1-hydroxymethyl-benzimidazole.

3. A surface-coating composition as set forth in claim 1, wherein the biocidal compound is 1-hydroxymethyl-2-methylbenzimidazole.

4. A surface-coating composition as set forth in claim 1 wherein the biocidal compound is 1-hydroxymethyl-6-nitrobenzimidazole.

5. A surface-coating composition as set forth in claim 1 wherein the biocidal compound is 1-hydroxymethyl-2-methyl-5-chlorobenzimidazole.

6. A surface-coating composition as set forth in claim 1 wherein the biocidal compound is 1,2-bis(hydroxymethyl)benzimidazole.

7. A surface-coating composition as set forth in claim 1 wherein the biocidal compound is 1-hydroxymethyl-2-hydroxymethylthiobenzimidazole.

8. A surface-coating composition as set forth in claim 1 that comprises an aqueous composition that contains about 10 percent to 60 percent by weight of said water-insoluble resinous binder.

9. A surface-coating composition as set forth in claim 8 that contains from 0.2 percent to 0.6 percent, based on the weight of the composition, of said biocidal compound.

10. The method of controlling the growth of fungi and bacteria in a surface-coating composition that contains a water-insoluble, film-forming, resinous binder selected from the group consisting of oleoresinous binders, synthetic linear addition polymers obtained by the vinyl polymerization of monoethylenically-unsaturated molecules, and mixtures thereof, which comprises incorporating in said composition about 0.10 percent to 3 percent, based on the weight of said composition, of a biocidal compound having the structural formula

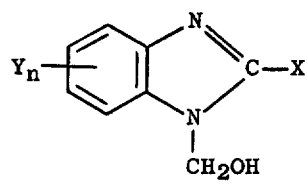

wherein X represents hydrogen, alkyl of 1 to 4 carbon atoms, hydroxymethyl, or hydroxymethylthio; Y represents nitro or halogen; and n represents a number in the range of 0 to 2.

11. The method of preventing bacteria-caused spoilage in an aqueous surface-coating composition that comprises incorporating in said aqueous composition 0.1 percent to 3 percent, based on the weight of the composition, of a biocidal compound having the structural formula

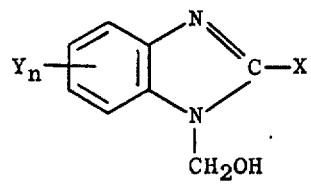

wherein X represents hydrogen, alkyl of 1 to 4 carbon atoms, hydroxymethyl, or hydroxymethylthio; Y represents nitro or halogen; and n represents a number in the range of 0 to 2.

12. The method of claim 11 wherein 0.2 percent to 0.6 percent by weight of the biocidal compound is incorporated into the aqueous surface-coating composition.

* * * * *